US012585504B2

(12) United States Patent (10) Patent No.: US 12,585,504 B2
Kim et al. (45) Date of Patent: Mar. 24, 2026

(54) METHOD AND APPARATUS WITH DATA LOADING

(71) Applicant: Samsung Electronics Co., Ltd., Suwon-si (KR)

(72) Inventors: Myeong Woo Kim, Suwon-si (KR); Yongdeok Kim, Suwon-si (KR); Changin Choi, Suwon-si (KR); Seungwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 18/351,737

(22) Filed: Jul. 13, 2023

(65) Prior Publication Data

US 2024/0231944 A1 Jul. 11, 2024

(30) Foreign Application Priority Data

Jan. 11, 2023 (KR) ........................ 10-2023-0004300

(51) Int. Cl.
G06F 3/00 (2006.01)
G06F 9/50 (2006.01)
G06F 16/17 (2019.01)

(52) U.S. Cl.
CPC ........ G06F 9/5055 (2013.01); G06F 16/1724 (2019.01)

(58) Field of Classification Search
CPC ....................................................... G06F 9/50
See application file for complete search history.

(56) References Cited

U.S. PATENT DOCUMENTS

| | | | | |
|---|---|---|---|---|
| 4,945,471 | A * | 7/1990 | Neches | ................. G06F 15/161 714/E11.073 |
| 5,890,156 | A * | 3/1999 | Rekieta | ................... G06F 16/27 707/999.008 |
| 9,063,939 | B2 * | 6/2015 | Dalton | ................. G06F 16/119 |
| 10,554,394 | B1 * | 2/2020 | Krut | ....................... H04L 9/0894 |
| 11,829,448 | B2 * | 11/2023 | Wu | ............................ G06F 9/46 |
| 2014/0082627 | A1 * | 3/2014 | Manjarekar | ........... G06F 9/5066 718/104 |
| 2020/0042362 | A1 | 2/2020 | Cui et al. | |
| 2020/0050971 | A1 | 2/2020 | Kim et al. | |

(Continued)

FOREIGN PATENT DOCUMENTS

AU        2020256047 A1 *  1/2021   ............. G16B 40/20

OTHER PUBLICATIONS

Gerhard Weikum, Dynamic File Allocation in Disk Arrays. (Year: 1991).*

*Primary Examiner* — Lechi Truong
(74) *Attorney, Agent, or Firm* — NSIP Law

(57) ABSTRACT
A processor-implemented method with data loading includes: based on sizes of a plurality of data files in a training dataset, dividing the training dataset into a plurality of sub-sets; loading some data files in each sub-set into a plurality of processors; determining a packing combination of one or more data files loaded to processors in a same group among the plurality of processors, based on a ratio of a number of data files between the plurality of sub-sets and a batch size of distributed training; determining packed data files by packing the one or more data files according to the packing combination; and reallocating the packed data files to the processors in the same group.

16 Claims, 12 Drawing Sheets

(56) References Cited

U.S. PATENT DOCUMENTS

| | | | |
|---|---|---|---|
| 2020/0372337 A1 | 11/2020 | Ebrahimi et al. | |
| 2021/0034535 A1* | 2/2021 | Lee | G06F 12/0246 |
| 2022/0129302 A1* | 4/2022 | Yuan | G06N 3/098 |
| 2022/0148569 A1 | 5/2022 | Ge et al. | |
| 2022/0391771 A1* | 12/2022 | Huang | G06N 20/00 |
| 2023/0140239 A1 | 5/2023 | Kim et al. | |
| 2023/0350728 A1* | 11/2023 | Briliauskas | G06F 21/562 |

* cited by examiner

| Combination Idx | Section 1 | Section 2 | Section 3 | Section 4 | The number of data for each sequence length 1~128 | 128~256 | 256~384 | 384~512 | Local batch size (The total number of data files) | Data ratio for 1~128 | Data ratio for 128~256 | Data ratio for 256~384 | Data ratio for 384~512 | Ratio difference from total dataset ratio |
|---|---|---|---|---|---|---|---|---|---|---|---|---|---|---|
| Total dataset ratio | | | | | | | | | | 0.373 | 0.197 | 0.117 | 0.314 | - |
| Entire dataset | - | - | - | - | 58,423,486 | 30,845,127 | 18,305,760 | 49,150,907 | 156,725,280 | 0.373 | 0.197 | 0.117 | 0.314 | - |
| Combination 1 | a | b | c | d | 6 | 3 | 2 | 5 | 16 | 0.375 | 0.188 | 0.125 | 0.313 | 0.02 |
| Combination 2 | 4a | b | c | d | 24 | 3 | 2 | 5 | 34 | 0.706 | 0.083 | 0.059 | 0.147 | 0.667 |
| Combination 3 | 2a+b | b | c | d | 12 | 9 | 2 | 5 | 28 | 0.429 | 0.321 | 0.071 | 0.179 | 0.361 |
| Combination 4 | 2a+c | 2b | c | d | 6 | 3 | 8 | 5 | 22 | 0.273 | 0.136 | 0.364 | 0.227 | 0.495 |
| Combination 5 | a | 2b | c | d | 6 | 6 | 2 | 5 | 19 | 0.316 | 0.316 | 0.105 | 0.263 | 0.239 |
| Combination 6 | 4a | 2b | c | d | 24 | 6 | 2 | 5 | 37 | 0.649 | 0.162 | 0.054 | 0.135 | 0.553 |
| Combination 7 | 2a+b | 2b | c | d | 12 | 12 | 2 | 5 | 31 | 0.387 | 0.387 | 0.065 | 0.161 | 0.409 |
| Combination 8 | 2a+c | 2b | c | d | 6 | 6 | 8 | 5 | 25 | 0.24 | 0.24 | 0.32 | 0.2 | 0.493 |
| Combination 9 | a | b+2a | c | d | 12 | 3 | 2 | 5 | 22 | 0.545 | 0.136 | 0.091 | 0.227 | 0.346 |
| Combination 10 | 4a | b+2a | c | d | 30 | 3 | 2 | 5 | 40 | 0.75 | 0.075 | 0.05 | 0.125 | 0.755 |
| Combination 11 | 2a+b | b+2a | c | d | 18 | 9 | 2 | 5 | 34 | 0.529 | 0.265 | 0.059 | 0.147 | 0.449 |
| Combination 12 | 2a+c | b+2a | c | d | 12 | 3 | 8 | 5 | 28 | 0.429 | 0.107 | 0.286 | 0.179 | 0.45 |
| Combination 13 | a | b | c+a | d | 8 | 3 | 2 | 5 | 18 | 0.444 | 0.167 | 0.111 | 0.278 | 0.143 |
| Combination 14 | 4a | b | c+a | d | 26 | 3 | 2 | 5 | 36 | 0.722 | 0.083 | 0.056 | 0.139 | 0.699 |
| Combination 15 | 2a+b | b | c+a | d | 14 | 9 | 2 | 5 | 30 | 0.467 | 0.3 | 0.067 | 0.167 | 0.394 |
| Combination 16 | 2a+c | b | c+a | d | 8 | 3 | 8 | 5 | 24 | 0.333 | 0.125 | 0.333 | 0.208 | 0.434 |
| Combination 17 | a | 2b | c+a | d | 8 | 6 | 2 | 5 | 21 | 0.381 | 0.286 | 0.095 | 0.238 | 0.195 |
| Combination 18 | 4a | 2b | c+a | d | 26 | 6 | 2 | 5 | 39 | 0.667 | 0.154 | 0.051 | 0.128 | 0.589 |
| Combination 19 | 2a+b | 2b | c+a | d | 14 | 12 | 2 | 5 | 33 | 0.424 | 0.364 | 0.061 | 0.152 | 0.436 |
| Combination 20 | 2a+c | 2b | c+a | d | 8 | 6 | 8 | 5 | 27 | 0.296 | 0.222 | 0.296 | 0.185 | 0.41 |
| Combination 21 | a | b+2a | c+a | d | 14 | 3 | 2 | 5 | 24 | 0.583 | 0.125 | 0.083 | 0.208 | 0.422 |
| Combination 22 | 4a | b+2a | c+a | d | 32 | 3 | 2 | 5 | 42 | 0.762 | 0.071 | 0.048 | 0.119 | 0.779 |
| Combination 23 | 2a+b | b+2a | c+a | d | 20 | 9 | 2 | 5 | 36 | 0.556 | 0.25 | 0.056 | 0.139 | 0.472 |
| Combination 24 | 2a+c | b+2a | c+a | d | 14 | 3 | 8 | 5 | 30 | 0.467 | 0.1 | 0.267 | 0.167 | 0.488 |

FIG. 5A

|       | batch 1 | batch 2 | batch 3 | batch 4 | Sum |
|-------|---------|---------|---------|---------|-----|
| GPU1  | 512     | 384     | 256     | 128     | 1280 |
| GPU2  | 498     | 356     | 224     | 96      | 1174 |
| GPU3  | 456     | 320     | 192     | 64      | 1032 |
| GPU4  | 420     | 288     | 160     | 32      | 900  |

FIG. 6A

|  | batch 1 | batch 2 | batch 3 | batch 4 | Sum |
|---|---|---|---|---|---|
| GPU1 | 512 | 288 | 256 | 32 | 1088 |
| GPU2 | 498 | 320 | 224 | 64 | 1106 |
| GPU3 | 456 | 356 | 192 | 96 | 1100 |
| GPU4 | 420 | 384 | 160 | 128 | 1092 |

FIG. 6B

METHOD AND APPARATUS WITH DATA LOADING

CROSS-REFERENCE TO RELATED APPLICATIONS

This application claims the benefit under 35 USC § 119(a) of Korean Patent Application No. 10-2023-0004300, filed on Jan. 11, 2023 in the Korean Intellectual Property Office, the entire disclosure of which is incorporated herein by reference for all purposes.

BACKGROUND

1. Field

The following description relates to a method and an apparatus with data loading.

2. Description of Related Art

Training of a deep learning model may include updating a weight parameter of the deep learning model based on training data. The training data may be divided into a batch size, e.g., the size of data to be trained at one time and used for training the deep learning model. Distributed training may include dividing and performing an operation for training the deep learning model in a plurality of graphics processing units (GPUs). Data parallelism is a method of distributed training that may include dividing and processing the training data in the plurality of GPUs and includes a process of synchronizing a result of the plurality of GPUs. Synchronization may include calculating a final update result by aggregating an update result of the plurality of GPUs whenever the weight parameter of the deep learning model is updated. Synchronization may be performed after batch training of each GPU is completed, so the waiting time for synchronization is reduced as the size of data processed during batch training in the plurality of GPUs is uniform.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method with data loading includes: based on sizes of a plurality of data files in a training dataset, dividing the training dataset into a plurality of sub-sets; loading some data files in each sub-set into a plurality of processors; determining a packing combination of one or more data files loaded to processors in a same group among the plurality of processors, based on a ratio of a number of data files between the plurality of sub-sets and a batch size of distributed training; determining packed data files by packing the one or more data files according to the packing combination; and reallocating the packed data files to the processors in the same group.

The determining of the packing combination may include: extracting candidate packing combinations that are packed in a maximum data file size according to the batch size of distributed training; and determining the packing combination among the candidate packing combinations based on the ratio of the number of data files between the plurality of sub-sets.

The determining of the packing combination may include: obtaining a ratio of a number of data files corresponding to each of the candidate packing combinations; comparing the ratio of the number of data files corresponding to each of the candidate packing combinations with the ratio of the number of data files between the plurality of sub-sets; and determining the packing combination based on a result of the comparing.

The determining of the packing combination may include: obtaining a ratio of a number of data files corresponding to each of the candidate packing combinations; and determining the packing combination based on the ratio of the number of data files corresponding to each of the candidate packing combinations and a packing batch size corresponding to each of the candidate packing combinations.

The reallocating of the packed data files may include reallocating the packed data files to the processors in the same group based on sizes of the packed data files.

The loading of some data files may include loading the some data files in each sub-set into the plurality of processors based on the ratio of the number of data files between the plurality of sub-sets and the batch size of distributed training.

The reallocating of the packed data files may include: aligning the packed data files in order of size; and in response to distributing a portion of the aligned packed data files to the processors in the same group in a predetermined first order, distributing another portion of the aligned packed data files in a second order which is a reverse order of the first order.

The distributing of the other portion of the aligned packed data files in the second order in response to distributing the portion of the aligned packed data files in the first order may be repeatedly performed in the batch size.

The same group may include a set of processors in a same server.

The training dataset may include either one or both of natural language text data for training a natural language processing (NLP) model and speech data for training of the NLP model.

The method may include training the NPL model based on the processors in the same group processing the reallocated packed data files.

The plurality of processors may include a plurality of graphics processing units (GPUs).

In one or more general aspects, a non-transitory computer-readable storage medium stores instructions that, when executed by a processor, configure the processor to perform any one, any combination, or all of operations and/or methods described herein.

In one or more general aspects, an apparatus with data loading includes: one or more processors configured to: based on sizes of a plurality of data files in a training dataset, divide the training dataset into a plurality of sub-sets; load some data files in each sub-set into a plurality of processors; determine a packing combination of one or more data files loaded into processors in a same group among the plurality of processors, based on a ratio of a number of data files between the plurality of sub-sets and a batch size of distributed training; determine packed data files by packing the one or more data files according to the packing combination; and reallocate the packed data files to the processors in the same group.

For the determining of the packing combination, the one or more processors may be configured to: extract candidate packing combinations that are packed in a maximum data file size according to the batch size of distributed training; and determine the packing combination among the candidate packing combinations based on the ratio of the number of data files between the plurality of sub-sets.

For the determining of the packing combination, the one or more processors may be configured to: obtain a ratio of the number of data files corresponding to each of the candidate packing combinations; and compare the ratio of the number of data files corresponding to each of the candidate packing combinations with the ratio of the number of data files between the plurality of sub-sets.

For the determining of the packing combination, the one or more processors may be configured to: obtain a ratio of the number of data files corresponding to each of the candidate packing combinations; and determine the packing combination based on the ratio of the number of data files corresponding to each of the candidate packing combinations and a packing batch size corresponding to each of the candidate packing combinations.

For the reallocating of the packed data files, the one or more processors may be configured to reallocate the packed data files to the processors in the same group based on sizes of the packed data files.

For the reallocating of the packed data files, the one or more processors may be configured to: align the packing data files in order of size; and in response to distributing a portion of the aligned packed data files to the processors in the same group in a predetermined first order, distributing another portion of the aligned packed data files in a second order which is a reverse order of the first order.

The one or more processors may be configured to repeatedly perform the distributing of the other portion of the aligned packed data files in the second order in response to distributing the portion of the aligned packed data files in the first order in the batch size.

Other features and aspects will be apparent from the following detailed description, the drawings, and the claims.

BRIEF DESCRIPTION OF THE DRAWINGS

FIGS. 5A and 5B illustrate examples of an operation of determining a packing combination of data files.

FIGS. 6A and 6B illustrate examples of an operation of reallocating loaded data files.

Figure 1:
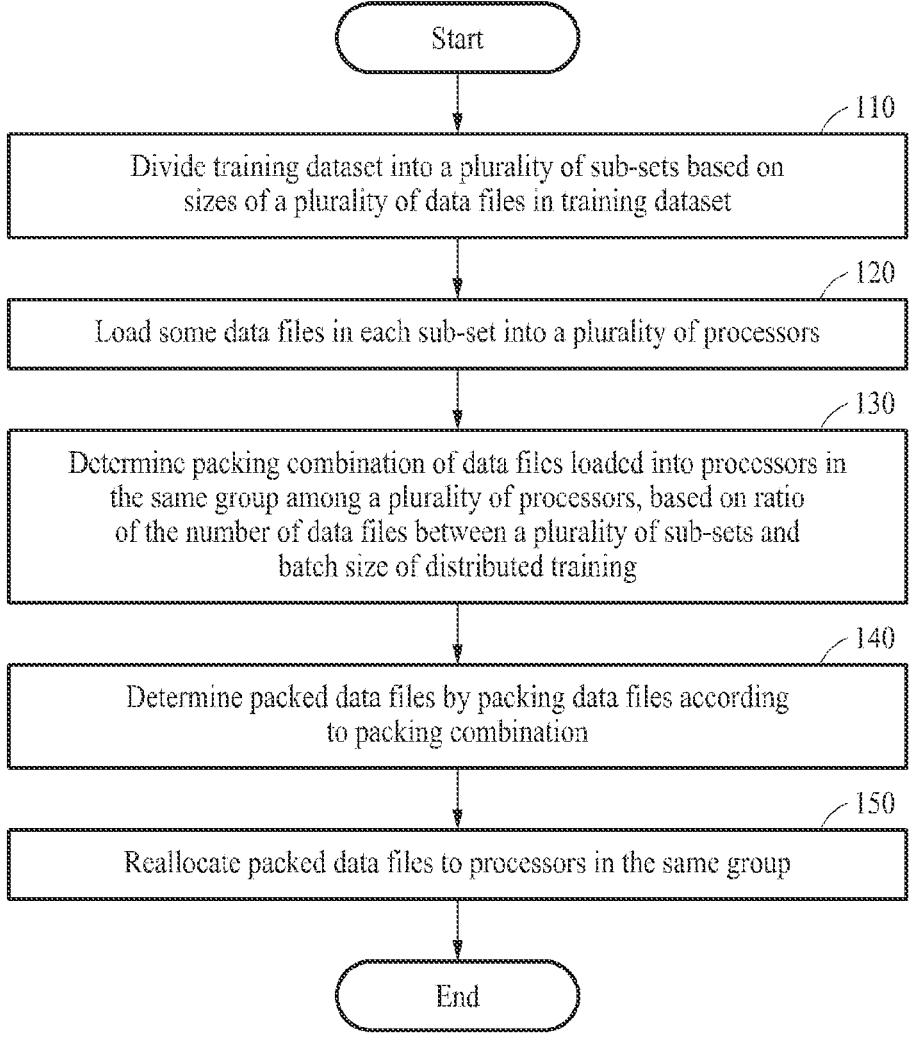
FIG. 1 illustrates an example of an operation of a method of loading data for a distributed training system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may be reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms used herein including technical or scientific terms have the same meaning as commonly understood by one of ordinary skill in the art to which this disclosure pertains and based on an understanding of the disclosure of the present application. It will be further understood that terms, such as those defined in commonly-used dictionaries, should be interpreted as having a meaning that is consistent with their meaning in the context of the relevant art and the disclosure of the present application, and will not be interpreted in an idealized or overly formal sense unless expressly so defined herein.

The examples may be implemented as various types of products, such as, for example, a personal computer (PC), a laptop computer, a tablet computer, a smartphone, a television (TV), a smart home appliance, an intelligent vehicle, a kiosk, and/or a wearable device. Hereinafter, examples will be described in detail with reference to the accompanying drawings. The same reference numerals shown in each drawing refer to the same elements.

FIG. 1 illustrates an example of an operation of a method of loading data for a distributed training system. Referring to FIG. 1, operations 110 to 150 may be sequentially performed, but examples are not limited thereto. For example, two or more operations may be parallelly performed.

Referring to FIG. 1, a method of loading data for a distributed training system including a plurality of processors may include operation 110 of, based on sizes of a plurality of data files in a training dataset, dividing the training dataset into a plurality of sub-sets, operation 120 of loading some data files in each sub-set into the plurality of processors, operation 130 of determining a packing combination of data files loaded to processors in the same group among the plurality of processors, based on a ratio of the number of data files between the plurality of sub-sets and a batch size of distributed training, operation 140 of determining packed data files by packing a data file according to the packing combination, and operation 150 of reallocating the packed data files to the processors in the same group.

The distributed training system may include at least one server (or node) including at least one processor that performs a training operation of a deep learning model. The processor of the distributed training system may be an operation processing module that updates a weight parameter of the deep learning model based on training data and may include, for example, a graphics processing unit (GPU).

The training dataset may include data files of various sizes for training a deep learning model. For example, when the deep learning model is a natural language processing (NLP) model, the training dataset may include natural language text files and/or speech audio files for training the NLP model.

Figure 2:
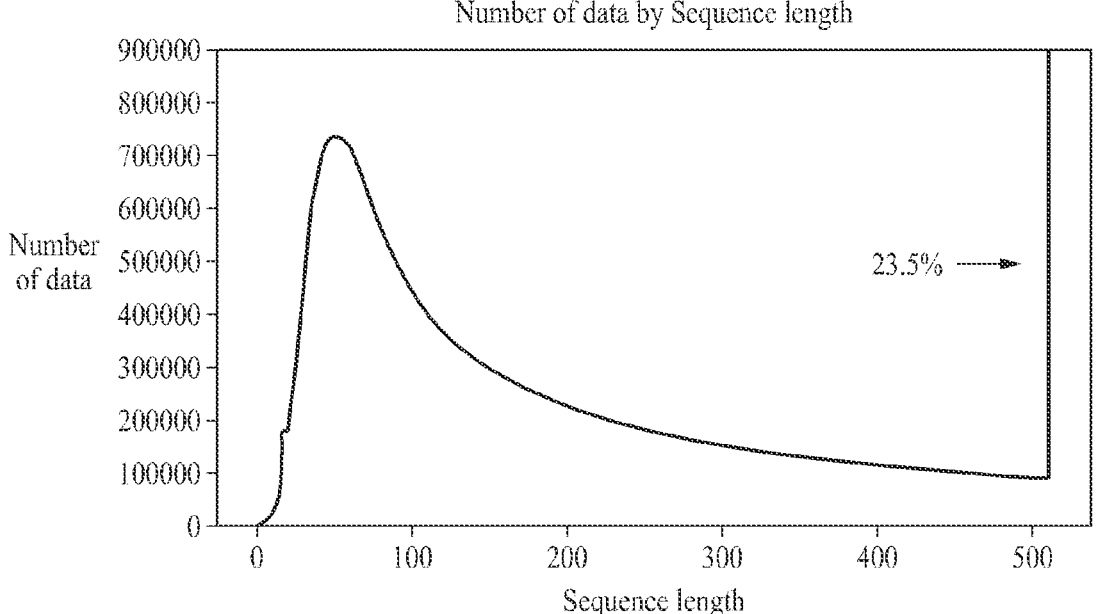
FIG. 2 illustrates an example of a distribution according to a sequence length of data files in a training dataset.

For example, FIG. 2 shows a distribution according to a sequence length of data files in a training dataset when the training dataset includes natural language text files for training an NLP model. Referring to FIG. 2, the number of data files corresponding to each sequence length may vary.

Operation 110 may include dividing a training dataset into a plurality of sub-sets based on sizes of a plurality of data files in a training dataset. A sub-set may be a subset of the training dataset, and each data file in the training dataset may be included in one sub-set corresponding to the size of the data file.

Each of the sub-sets may include a data file having a size of a corresponding section of the sub-set. For example, the sub-set may correspond to a subset obtained (e.g., determined) by dividing the entire training dataset based on the size of the data file.

The entire training dataset may be divided into a predetermined number of sub-sets. The number (e.g., a total number and/or total quantity) of sub-sets may be determined based on at least one of the number of processors, a batch size, and/or a user input. For example, the number of sub-sets may be determined as the number of sub-sets input by a user, as a smaller number than the batch size, as a divisor of the batch size, and/or so that at least one data file is allocated to each of the plurality of processors in each sub-set. Furthermore, the size of a data file may be expressed as a sequence length of the data file.

Figure 3A:
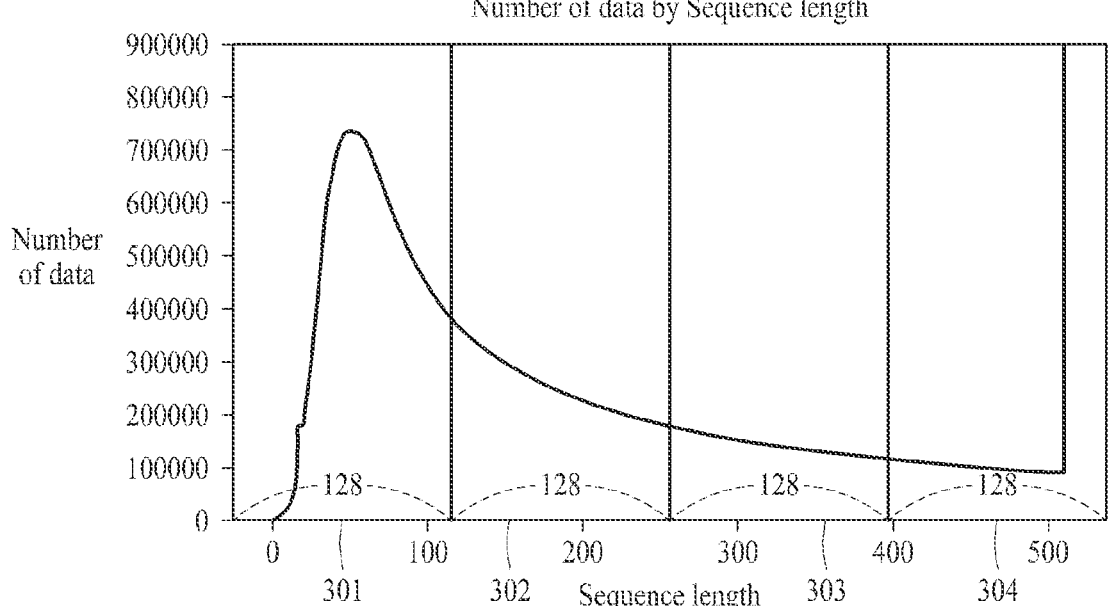
FIGS. 3A and 3B illustrate examples of a case in which a training dataset is divided into a sub-set corresponding to a section having a sequence length of "128".

For example, FIG. 3A shows a case in which a training dataset having a distribution of a sequence length as shown in FIG. 2 is divided into a sub-set corresponding to a section having a sequence length of "128". More specifically, referring to FIG. 3A, a range of a data size greater than "0" and less than or equal to "512" corresponding to the training dataset may be divided into four sections 301, 302, 303, and 304 each having a sequence length of "128". The training dataset may be divided into four sub-sets respectively corresponding to each of the four sections 301, 302, 303, and 304 according to a sequence length of a data file. For example, a data file having a sequence length less than or equal to "128" among data files in the training dataset may be divided into a first sub-set corresponding to the section 301, a data file having a sequence length greater than "128" and less than or equal to "256" may be divided into a second sub-set corresponding to the section 302, a data file having a sequence length greater than "256" and less than or equal to "384" may be divided into a third sub-set corresponding to the section 303, and a data file having a sequence length greater than "384" and less than or equal to "512" may be divided into a fourth sub-set corresponding to the section 304.

The number of data files in each sub-set according to a distribution of sequence lengths of data files may not be the same. For example, referring to FIG. 3B, the number of data files in the first sub-set corresponding to the section 301 having a sequence length less than or equal to "128" may correspond to 31.4% of all data files in the training dataset, the number of data files in the second sub-set corresponding to the section 302 having a sequence length greater than "128" and less than or equal to "256" may correspond to 11.7% of all data files in the training dataset, the number of data files in the third sub-set corresponding to the section 303 having a sequence length greater than "256" and less than or equal to "384" may correspond to 19.7% of all data files in the training dataset, and the number of data files in the fourth sub-set corresponding to the section 304 having a sequence length greater than "384" and less than or equal to "512" may correspond to 37.3% of all data files in the training dataset. However, the distribution of sequence lengths of data files, the number of sections, and a ratio of data files corresponding to each section shown in FIG. 3A are only examples and may be variously changed according to design.

Operation 120 may include loading some data files in each sub-set into a plurality of processors. Operation 120 may include loading some data files in each sub-set into the plurality of processors based on a ratio of the number of data files between a plurality of sub-sets and a batch size of distributed training.

The batch size may correspond to a number of data files trained at one time in one processor. For example, when a batch size is "16", "16" data files may be loaded into a processor and updating of a weight parameter for training a deep learning model may be performed. The batch size may be predetermined. The batch size may also be referred to as a local batch size.

The number of data files loaded into each processor in a certain sub-set may be determined based on the batch size and the ratio of the number of data files in a corresponding sub-set to the total number of data files in the entire training dataset.

Figure 3B:
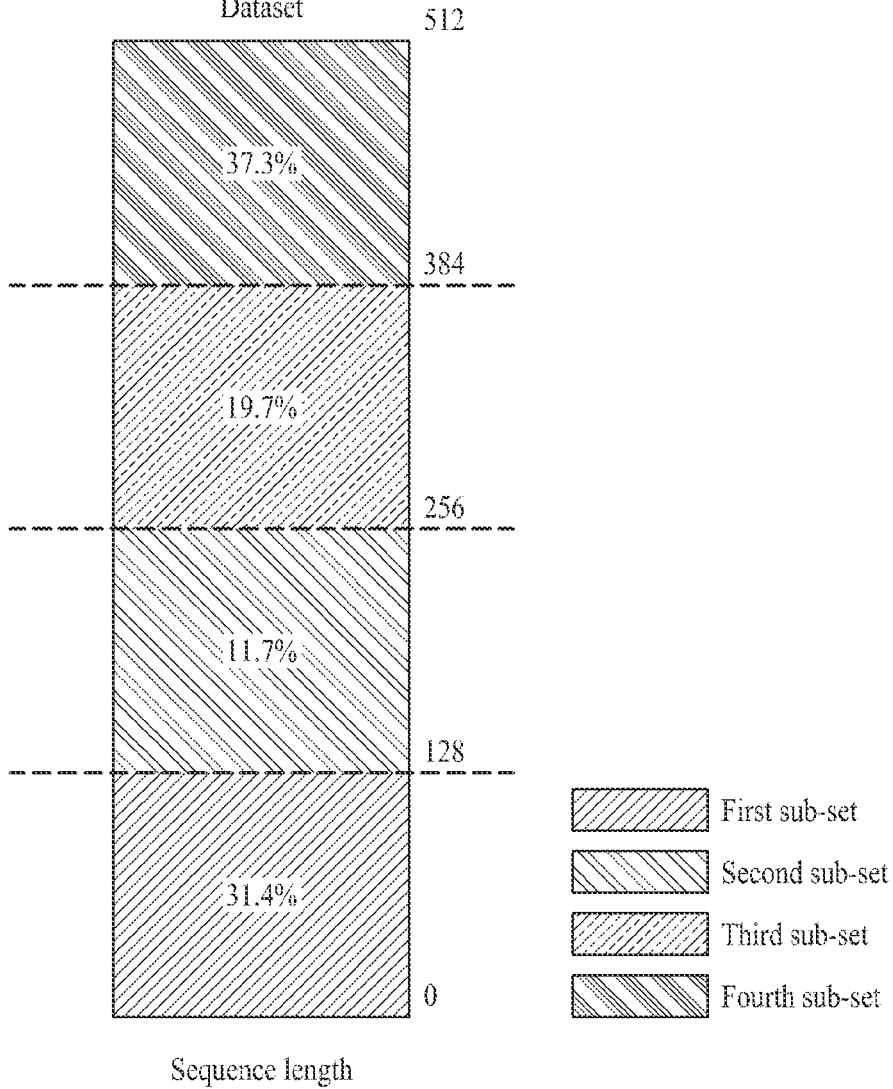

As shown in FIG. 3B, a training dataset may be divided into the first sub-set to the fourth sub-set, and when a batch size of distributed training is "16", five data files (corresponding to 31.4% of the batch size "16") in the first sub-set, two data files (corresponding to 11.7% of the batch size "16") in the second sub-set, three data files (corresponding to 19.7% of the batch size "16") in the third sub-set, and six data files (corresponding to 37.3% of the batch size "16") in the fourth sub-set may be extracted and be loaded into a processor. Accordingly, in an example, a number of data files (e.g., "5") extracted from a subset (e.g., the first subset) may be, rounded to the nearest integer, the batch size (e.g., "16") multiplied by the proportion of the subset (e.g., 31.4%).

Additionally or alternatively, considering that a data file will be packed later, more data may be loaded into a processor than data determined based on a multiplication of the batch size and the ratio of the number of data files between the plurality of sub-sets. As sizes of data files corresponding to each of the plurality of sub-sets decrease, more data files may be loaded into the processor.

For example, as shown in FIG. 3B, the training dataset may be divided into the first sub-set to the fourth sub-set, and when a batch size of distributed training is "16", n1 may be extracted in addition to "5" in the first sub-set, n2 may be extracted in addition to "2" in the second sub-set, n3 may be extracted in addition to "3" in the third sub-set, and n4 may be extracted in addition to "6" in the fourth sub-set and the n1 to n4 may be loaded into a processor. Here, n1 to n4 are natural numbers greater than or equal to "1" and sizes of n1 to n4 may be inversely proportional to the size of a data file corresponding to each of the plurality of sub-sets. For example, n1 to n4 may satisfy n1>n2>n3>n4.

Figure 4A:
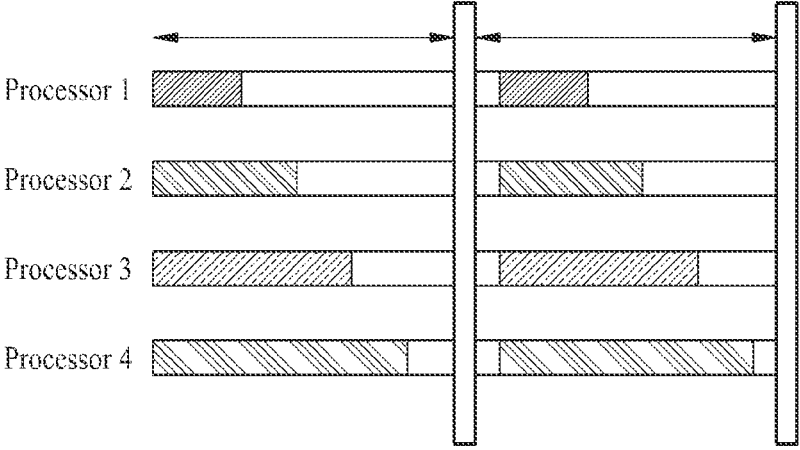
FIGS. 4A to 4C illustrate examples of a method of loading data.
Figure 4B:
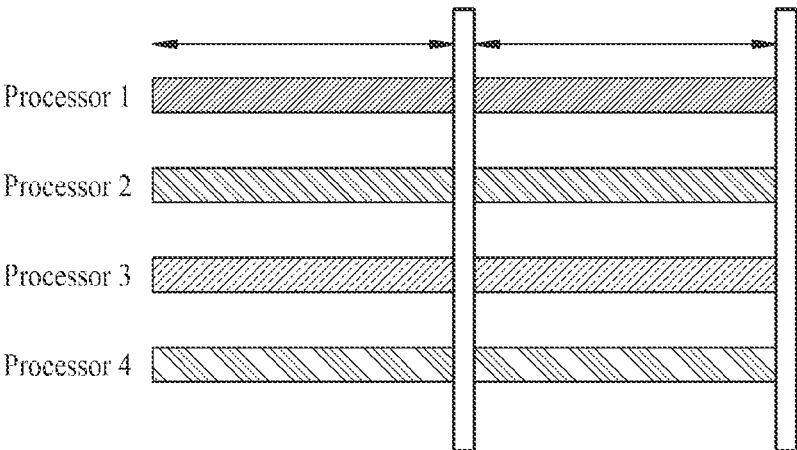
Figure 4C:
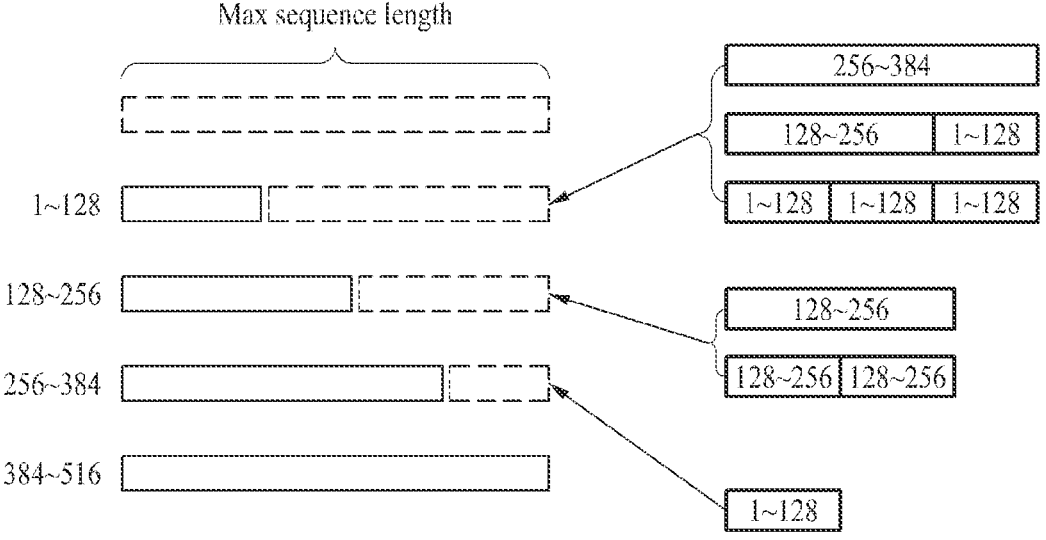

FIGS. 4A to 4C illustrate examples of a method of loading data. A general method of loading data is described with reference to FIGS. 4A to 4C before describing a method of loading data accompanied by packing in consideration of a data distribution ratio of the entire dataset.

Referring to FIG. 4A, sizes of data processed by each processor (e.g., each GPU) may be different during distributed training that uses training data having different sizes (e.g., sequence lengths) of data files. In this case, in a typical method of loading data, a difference in training speed between processors may occur, and accordingly, sync overhead in which a processor that trains a short data length waits for other processors may occur. For example, even when training of processor 1 is completed, the processor 1 may have to wait until training of processor 4 is completed.

Referring to FIG. 4B, in a typical method of loading data, to compensate for sync overhead, a training dataset for each size of each data file may be separated, data may be loaded from the separated dataset, and then the data may be aligned by length and distributed to a processor in a node. Accordingly, a length imbalance of data processed between processors may be reduced, so that sync overhead is reduced. However, the typical method may be less operationally efficient when the size of a data file among training datasets is much smaller than a maximum data size (e.g., "512").

Referring to FIG. 4C, when the size of a data file among training datasets is much smaller than a maximum data size, a data file may be packed in a maximum data size range to compensate for reducing operational efficiency. The packing may increase operational efficiency during the same kernel operation and an effective batch size may increase by increasing data to be trained.

For example, when a maximum sequence length is "512" (e.g., in an example of FIG. 2), any of three data files having a sequence length less than or equal to "128" (e.g., included in the first sub-set), one data file having a sequence length greater than "128" and less than or equal to "256" (e.g., included in the second sub-set), one data file having a sequence length less than or equal to "128" (e.g., included in the first sub-set), and one data file having a sequence length greater than "256" and less than or equal to "384" (e.g., included in the third sub-set) may be packed in a section (e.g., a section of data to be loaded into and processed by a particular processor or processor group) having a filled sequence length less than or equal to "128".

Similarly, two data files having a sequence length less than or equal to "128" and one data file having a sequence length greater than "128" and less than or equal to "256" may be packed in a section having a sequence length greater than "128" and less than or equal to "256", and one data file having a sequence length less than or equal to "128" may be packed in a section having a sequence length greater than "256" and less than or equal to "384".

As above-described, operational efficiency may be supplemented through the data file packing, but packing may affect a training data distribution. More specifically, when such typical method of loading data is implemented and training proceeds without considering a data distribution of a training dataset, a convergence behavior may degrade. For example, when distributed training is performed by packing data to increase operational efficiency, training may not be performed as intended because the training is performed without following the data distribution of the training dataset.

In contrast, as described in detail below, the method of loading data for the distributed training system of one or more embodiments may perform packing in consideration of a data distribution ratio of the entire dataset in a divided dataset.

Operation 130 may include determining a packing combination of data files loaded into processors in the same group among a plurality of processors, based on a ratio of the number of data files between a plurality of sub-sets and a batch size of distributed training.

The same group is a unit of processors having low communication cost for communication with each other and may include, for example, a set of the processors in the same server. A processor of the group may through communication with other processors of the group, share the size of a data file allocated and may exchange the allocated data file with the other processors.

Operation 130 may include extracting candidate packing combinations that may be packed in a maximum data file size according to a batch size of training and determining a packing combination among the candidate packing combinations based on a ratio of the number of data files between a plurality of sub-sets.

Referring to FIG. 5A, when a batch size is "16", candidate packing combinations that may be packed in a maximum data file size may be "24" (four possible combinations in a section having a sequence length less than or equal to "128" multiplied by three possible combinations in a section having a sequence length greater than "128" and less than or equal to "256" multiplied by two possible combinations in a section having a sequence length greater than "256" and less than or equal to "384" multiplied by one possible combination in a section having a sequence length greater than "384" and less than or equal to "516").

In FIG. 5A, "a" denotes a data file having a sequence length less than or equal to "128" (e.g., included in the first sub-set), "b" denotes a data file having a sequence length greater than "128" and less than or equal to "256" (e.g., included in the second sub-set), "c" denotes a data file having a sequence length greater than "256" and less than or equal to "384" (e.g., included in the third sub-set), and "d" denotes a data file having a sequence length greater than "384" and less than or equal to "516" (e.g., included in the fourth sub-set).

For example, combination 2 may refer to a combination in which four data files having a sequence length less than or equal to "128" are packed in a section having a filled sequence length less than or equal to "128" and are not packed in the remaining sections.

Figure 5B:
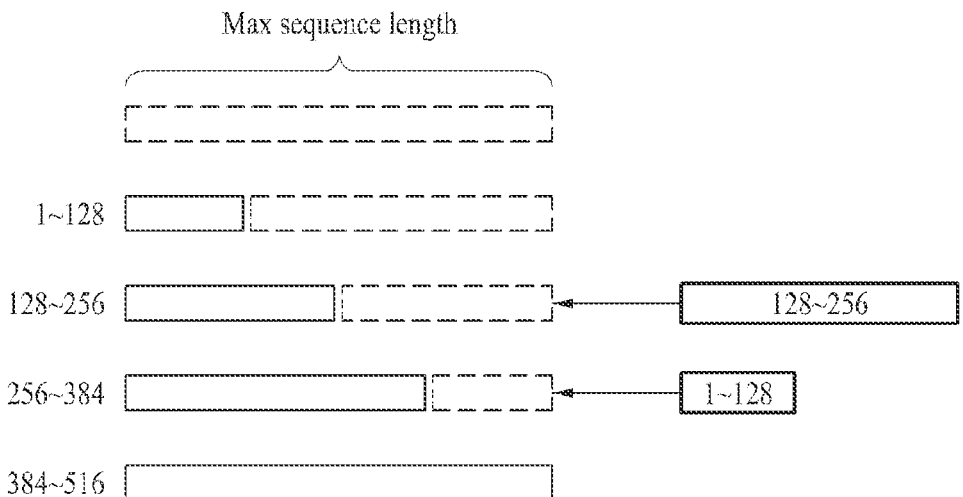

Referring to FIGS. 5A and 5B, combination 17 may refer to a combination in which two data files having a sequence length greater than "128" and less than or equal to "256" may be packed in a section having a sequence length greater than "128" and less than or equal to "256", one data file having a sequence length less than or equal to "128" may be packed in a section having a sequence length greater than "256" and less than or equal to "384", and no data files may be packed in the remaining section.

When a batch size is "16", in combination 1 in which no data is packed, six data files having a sequence length less than or equal to "128" corresponding to 37.3% of the batch size "16", three data files three data having a sequence length greater than "128" and less than or equal to "256" corresponding to 19.7% of the batch size "16", two data files two data having a sequence length greater than "256" and less than or equal to "384" corresponding to 11.7% of the batch size "16", and five data files having a sequence length greater than "384" and less than or equal to "512" corresponding to 31.4% of the batch size "16" may exist.

Operation 130 may include determining a packing combination among candidate packing combinations based on a ratio of the number of data files among a plurality of sub-sets.

A ratio of the number of data files corresponding to each of candidate packing combinations may be obtained, the ratio of the number of data files corresponding to each of the candidate packing combinations may be compared with a ratio of the number of data files between a plurality of sub-sets, and a packing combination may be determined based on a result of the comparison.

In combination 2, since four data files having a sequence length less than or equal to "128" are packed in a section having a sequence length less than or equal to "128", "24" (6 multiplied by 4) data files having a sequence length less than or equal to "128" may exist and the number of data files may be the same as that of combination 1 in the remaining sections. In this case, a batch size may increase from "16" to "34" by packing. Hereinafter, the batch size after packing may be referred to as a packing batch size.

In combination 2, data having a sequence length less than or equal to "128" may have a ratio corresponding to "0.706" (24/34) among packing batch sizes, data having a sequence length greater than "128" and less than "256" may have a ratio corresponding to "0.088" (3/34) among the packing batch sizes, data having a sequence length greater than "256" and less than "384" may have a ratio corresponding to "0.059" (2/34) among the packing batch sizes, and data having a sequence length greater than "384" and less than "516" may have a ratio corresponding to "0.147" (5/34) among the packing batch sizes. A ratio difference from a total dataset ratio of combination 2 may be "0.667" ((|0.706−0.373|)+(|0.088−0.197|)+(|0.059−0.117|)+ (|0.147−0.314|)).

In combination 17, since two data files having a sequence length greater than "128" and less than or equal to "256" are packed in a section having a sequence length greater than "128" and less than or equal to "256" and one data file having a sequence length less than or equal to "128" is packed to a data file having a sequence length greater than "256" and less than or equal to "384" in a section having a sequence length greater than "256" and less than or equal to "384", eight data files (6+2) having a sequence length less than or equal to "128" and six data files (3 multiplied by 2) having a sequence length greater than "128" and less than or equal to "256" may exist, and the number of data files may be the same as that of combination 1 in the remaining sections. In this case, a packing batch size may increase from "16" to "21".

In combination 17, data having a sequence length less than or equal to "128" may have a ratio corresponding to "0.381" (8/21) among packing batch sizes, data having a sequence length greater than "128" and less than "256" may have a ratio corresponding to "0.286" (6/21) among the packing batch sizes, data having a sequence length greater than "256" and less than "384" may have a ratio corresponding to "0.095" (2/21) among the packing batch sizes, and data having a sequence length greater than "384" and less than "512" may have a ratio corresponding to "0.238" (5/21) among the packing batch sizes. A ratio difference from a total dataset ratio of combination 2 may be "0.195" ((|0.381−0.373|)+(|0.286−0.197|)+(|0.095−0.117|)+ (|0.238−0.314|)).

Among combinations 1 to 24, a ratio difference from a total dataset ratio of combination 17 may be the smallest. Accordingly, combination 17 may be determined as a final packing combination.

Additionally or alternatively, operation 130 may determine a packing combination based on a ratio of the number of data files corresponding to each of candidate packing combinations and a packing batch size corresponding to each of the candidate packing combinations. For example, a final score may be determined by weight-summing a first score determined based on the ratio difference from the total dataset ratio and a second score determined based on the packing batch size and a candidate packing combination having the highest final score may be determined as a final packing combination. The smaller the ratio difference with the total dataset ratio, the higher the first score, and the larger the packing batch size, the higher the second score.

Operation 140 may include determining packed data files by packing data files according to a packing combination. The data file in which packing is performed may be referred to as a packing data file.

Operation 150 may include reallocating packed data files to processors in the same group. Since communication speed between processors in the same server is faster than communication speed between processors in different servers, the method of loading data for a distributed training system of one or more embodiments may reduce communication overhead. Based on communication between the processors in the same group having less communication overhead, the method of loading data for a distributed training system of one or more embodiments may reduce cost required by communication compared to a typical method of reallocating based on communication between all processors by reallocating pre-allocated data files to the processors in the same group.

Operation 150 of reallocating packed data files may include aligning data files loaded in processors in the same group in order of size and distributing the aligned data files to the processors in the same group in a predetermined order.

For example, FIG. 6A shows sequence lengths of data files disposed on GPU1, GPU2, GPU3, and GPU4 when a batch size of distributed training is "4". GPU1, GPU2, GPU3, and GPU4 may respectively correspond to processors in the same server. For example, the same server may include GPU1, GPU2, GPU3, and GPU4. Referring to FIG. 6A, "16" data files allocated to four GPUs may be aligned in descending order based on size. The data files aligned in descending order of size may be distributed to the GPUs in order of GPU1, GPU2, GPU3, and GPU4. More specifically, the largest data file having a sequence length of "512" may be allocated to GPU1, the next largest data file having a sequence length of "498" may be allocated to GPU2, the next largest data file having a sequence length of "456" may be allocated to GPU3, the next largest data file having a sequence length of "420" may be allocated to GPU4 sequentially, and the next largest data file having a sequence length of "384" may be allocated to GPU1 again. The order among GPU1, GPU2, GPU3, and GPU4 may be arbitrarily predetermined. The distributing of data files to the GPUs may be repeated until a batch-sized data file is allocated to each processor.

A predetermined order among a plurality of processors may be changed each round when data files are distributed. For example, after a certain number of data files is distributed to the plurality of processors in a first order predetermined among the plurality of processors, a certain number of data files may be distributed to the plurality of processors in a second order that is different from the first order. For example, operation 160 of reallocating packed data files may include aligning data files loaded to processors in the same group in order of size, and after distributing the aligned data files to the processors in the same group in the first order predetermined, distributing the aligned data files in the second order, which is a reverse order of the first order. The distributing the aligned data files in the second order after distributing the aligned data files in the first order may be repeatedly performed in a batch size.

For example, FIG. 6B shows a sequence length of data files disposed on GPU1, GPU2, GPU3, and GPU4 when a batch size of distributed training is "4". GPU1, GPU2, GPU3, and GPU4 may correspond to processors in the same server. Referring to FIG. 6B, "16" data files allocated to four GPUs may be aligned in descending order based on size. After the data files aligned in descending order of size are distributed to the GPUs in the first order of GPU1, GPU2, GPU3, and GPU4, the data files may be distributed to the GPUs in the second order of GPU1, GPU2, GPU3, and GPU4, which is a reverse order of the first order. The distributing of data files to the GPUs alternately in the first order and in the second order may be repeated until a data file of a batch size is allocated to each processor.

Referring to FIGS. 6A and 6B, it may be seen that in FIG. 6A, a data file having the largest size is allocated to GPU1 at one round of distribution, whereas in FIG. 6B, a data file having the largest size is alternately allocated to GPU1 and GPU4 at one round of distribution. As a result of reallocating data files corresponding to a batch size of each processor by repeatedly performing a distribution operation, it may be seen that a deviation in the sum of sizes of the data files reallocated to each GPU is smaller in FIG. 6B than in FIG. 6A. For example, it may be seen that the sum of sizes of data files allocated to each processor is more uniform in FIG. 6B than in FIG. 6A.

Operation 160 of reallocating packed data files may include reallocating loaded data files using various methods of allocating data files of uniform size to a plurality of processors. For example, the data files may be distributed in such a way that a processor to which a first data file is allocated is replaced in every distribution round in which one data file is allocated to each processor in order of size of the data file. In another example, in every distribution round, the data files may be distributed in such a way that an order of processors to which data files are allocated in order of size is randomly determined.

Figure 7:
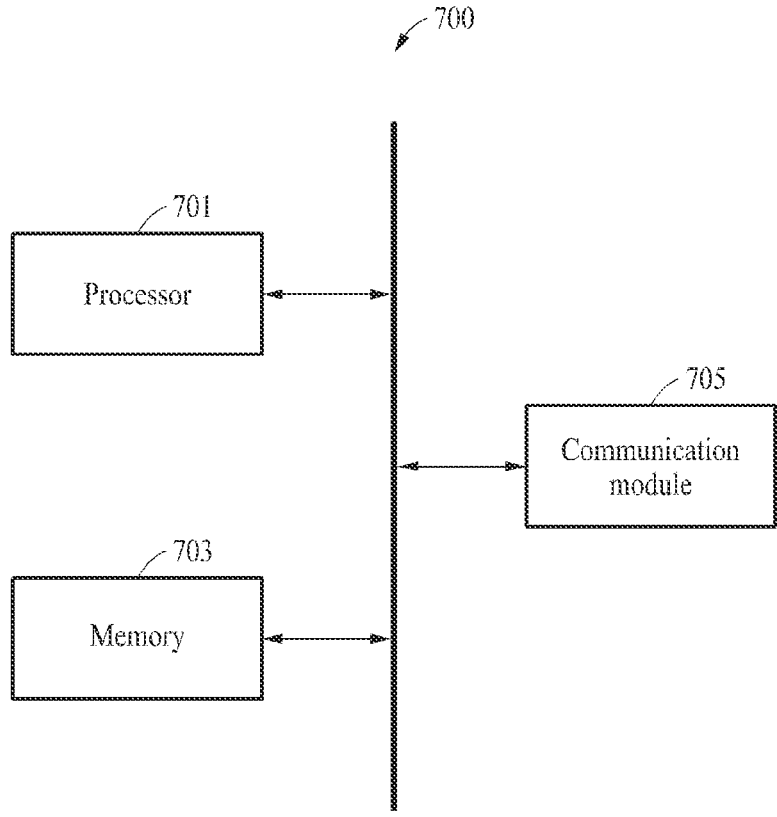
FIG. 7 illustrates an example of a configuration of an apparatus.

FIG. 7 illustrates an example of a configuration of an apparatus.

Referring to FIG. 7, an apparatus 700 may include a processor 701 (e.g., one or more processors), a memory 703 (e.g., one or more memories), and a communication module 705.

The apparatus 700 may be or include an apparatus that performs a method of loading data for a distributed training system including a plurality of processors above-described with reference to FIGS. 1 to 6B. The plurality of processors in the distributed training system is processors that perform a distributed training operation, and may include, for example, a GPU. To distinguish between a processor that performs the distributed training operation and the processor 701 of the apparatus 700, the processor that performs the distributed training operation may be referred to as a training processor hereinafter.

The processor 701 may perform at least one operation above-described with reference to FIGS. 1 to 6B. For example, the processor 701 may perform at least one of, based on sizes of a plurality of data files in a training dataset, dividing the training dataset into a plurality of sub-sets, loading some data files in each sub-set into the plurality of processors, determining a packing combination of data files loaded into processors in a same group among the plurality of processors, based on a ratio of the number of data files between the plurality of sub-sets and a batch size of distributed training, determining packed data files by packing a data file according to the packing combination, and reallocating the packed data files to the processors in the same group.

The memory 703 may be a volatile or non-volatile memory and may store data regarding the method of loading data above-described with reference to FIGS. 1 to 6B. For example, the memory 703 may store data generated in a process of performing the data loading method or data necessary for performing the data loading method. For example, the memory 703 may be or include a non-transitory computer-readable storage medium storing instructions that, when executed by the processor 701, configure the processor 701 to perform any one, any combination, or all of the operations and methods described herein with reference to FIGS. 1-7.

The communication module 705 may provide a function for the apparatus 700 to communicate with other electronic devices or other servers through a network. For example, the apparatus 700 may be connected to an external device (e.g., a user terminal, server, or network) through the communication module 705 to exchange data therewith. For example, the apparatus 700 may transmit and receive data to and from at least one server including at least one training processor for distributed training through the communication module 705. In another example, the apparatus 700 may transmit and receive data to and from a database storing a training dataset for distributed training through the communication module 705.

The memory 703 may store a program in which the data loading method above-described with reference to FIGS. 1 to 6B is implemented. The processor 701 may execute a program stored in the memory 703 and control the apparatus 700. Code of the program executed by the processor 701 may be stored in the memory 703.

The apparatus 700 may further include other components not shown in the drawings. For example, the apparatus 700 may further include an input/output interface including an input device and an output device as means for interfacing with the communication module 705. In another example, the apparatus 700 may further include other components, such as a transceiver, various sensors, and a database.

The apparatuses, processors, memories, communication modules, apparatus 700, processor 701, memory 703, communication module 705, and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method with data loading, the method comprising:

based on sizes of a plurality of data files in a training dataset, dividing the training dataset into a plurality of sub-sets;

loading some data files in each sub-set into a plurality of processors;

determining a packing combination of one or more data files loaded to processors in a same group among the plurality of processors, based on a ratio of a number of data files between the plurality of sub-sets and a batch size of distributed training;

determining packed data files by packing the one or more data files according to the packing combination; and reallocating the packed data files to the processors in the same group, wherein the reallocating of the packed data files comprises:

aligning the packed data files in order of size; and in response to distributing a portion of the aligned packed data files to the processors in the same group in a predetermined first order, distributing another portion of the aligned packed data files in a second order which is a reverse order of the first order, and wherein the distributing of the other portion of the aligned packed data files in the second order in response to distributing the portion of the aligned packed data files in the first order is repeatedly performed in the batch size.

2. The method of claim 1, wherein the determining of the packing combination comprises:

extracting candidate packing combinations that are packed in a maximum data file size according to the batch size of distributed training; and determining the packing combination among the candidate packing combinations based on the ratio of the number of data files between the plurality of sub-sets.

3. The method of claim 2, wherein the determining of the packing combination comprises:

obtaining a ratio of a number of data files corresponding to each of the candidate packing combinations;

comparing the ratio of the number of data files corresponding to each of the candidate packing combinations with the ratio of the number of data files between the plurality of sub-sets; and determining the packing combination based on a result of the comparing.

4. The method of claim 2, wherein the determining of the packing combination comprises:

obtaining a ratio of a number of data files corresponding to each of the candidate packing combinations; and determining the packing combination based on the ratio of the number of data files corresponding to each of the candidate packing combinations and a packing batch size corresponding to each of the candidate packing combinations.

5. The method of claim 1, wherein the reallocating of the packed data files comprises reallocating the packed data files to the processors in the same group based on sizes of the packed data files.

6. The method of claim 1, wherein the loading of some data files comprises loading the some data files in each sub-set into the plurality of processors based on the ratio of the number of data files between the plurality of sub-sets and the batch size of distributed training.

7. The method of claim 1, wherein the same group comprises a set of processors in a same server.

8. The method of claim 1, wherein the training dataset comprises either one or both of natural language text data for training a natural language processing (NLP) model and speech data for training of the NLP model.

9. The method of claim 8, further comprising training the NPL model based on the processors in the same group processing the reallocated packed data files.

10. The method of claim 1, wherein the plurality of processors comprises a plurality of graphics processing units (GPUs).

11. A non-transitory computer-readable storage medium storing instructions that, when executed by one or more processors, configure the one or more processors to perform the method of claim 1.

12. An apparatus with data loading, the apparatus comprising:

one or more processors configured to:

based on sizes of a plurality of data files in a training dataset, divide the training dataset into a plurality of sub-sets;

load some data files in each sub-set into a plurality of processors;

determine a packing combination of one or more data files loaded into processors in a same group among the plurality of processors, based on a ratio of a number of data files between the plurality of sub-sets and a batch size of distributed training;

determine packed data files by packing the one or more data files according to the packing combination; and reallocate the packed data files to the processors in the same group, wherein, for the reallocating of the packed data files, the one or more processors are configured to:

align the packed data files in order of size; and in response to distributing a portion of the aligned packed data files to the processors in the same group in a predetermined first order, distributing another portion of the aligned packed data files in a second order which is a reverse order of the first order, and wherein the one or more processors are configured to repeatedly perform the distributing of the other portion of the aligned packed data files in the second order in response to distributing the portion of the aligned packed data files in the first order in the batch size.

13. The apparatus of claim 12, wherein, for the determining of the packing combination, the one or more processors are configured to:

extract candidate packing combinations that are packed in a maximum data file size according to the batch size of distributed training; and determine the packing combination among the candidate packing combinations based on the ratio of the number of data files between the plurality of sub-sets.

14. The apparatus of claim 13, wherein, for the determining of the packing combination, the one or more processors are configured to:

obtain a ratio of the number of data files corresponding to each of the candidate packing combinations; and compare the ratio of the number of data files corresponding to each of the candidate packing combinations with the ratio of the number of data files between the plurality of sub-sets.

15. The apparatus of claim 13, wherein, for the determining of the packing combination, the one or more processors are configured to:

obtain a ratio of the number of data files corresponding to each of the candidate packing combinations; and determine the packing combination based on the ratio of the number of data files corresponding to each of the candidate packing combinations and a packing batch size corresponding to each of the candidate packing combinations.

16. The apparatus of claim 13, wherein, for the reallocating of the packed data files, the one or more processors are configured to reallocate the packed data files to the processors in the same group based on sizes of the packed data files.

* * * * *